US006907657B2

United States Patent
Wilbert et al.

(10) Patent No.: US 6,907,657 B2
(45) Date of Patent: Jun. 21, 2005

(54) APPARATUS FOR MOUNTING A HOLLOW WORK PIECE

(75) Inventors: Thomas M. Wilbert, Wolcott, NY (US); William G. Herbert, Williamson, NY (US); Jennifer Y. Hwang, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 85 days.

(21) Appl. No.: 10/643,354

(22) Filed: Aug. 19, 2003

(65) Prior Publication Data

US 2005/0039326 A1 Feb. 24, 2005

(51) Int. Cl.$^7$ ............................ B23P 21/00; B23P 19/02
(52) U.S. Cl. ........................................ 29/717; 29/235
(58) Field of Search ......................... 29/717, 700, 235, 29/272, 281.6, 895, 895.2, 895.1; 269/7, 266; 492/57; 399/107, 117

(56) References Cited

U.S. PATENT DOCUMENTS

| 3,680,341 A | * | 8/1972 | Finn, Jr. ....................... 72/125 |
| 4,822,013 A |   | 4/1989 | Johnson ......................... 269/7 |
| 5,138,918 A |   | 8/1992 | Attardi et al. ............... 82/1.11 |
| 6,209,429 B1 |  | 4/2001 | Urso, III et al. ............. 82/1.11 |

FOREIGN PATENT DOCUMENTS

| EP | 0240218 | 7/1987 |
| WO | WO 9615873 | 5/1996 |

* cited by examiner

Primary Examiner—John C. Hong
(74) Attorney, Agent, or Firm—Tallam I. Nguti

(57) ABSTRACT

A mounting apparatus for mounting a hollow work-piece on a machine includes a circumferential groove formed into an outer surface of a cylindrical supporting fixture of the machine, a dampening plug assembly for positioning inside the hollow workpiece adjacent the cylindrical supporting fixture, and an end pressure reducing device for mounting within the circumferential groove for centrifugally supporting and enabling the reduction of machining-induced pressure from the end of the hollow workpiece.

20 Claims, 5 Drawing Sheets

APPARATUS FOR MOUNTING A HOLLOW WORK PIECE

FIELD OF THE INVENTION

The present invention is directed to machine tools, and more particularly to an apparatus for mounting a hollow work-piece, for example a drum or tube blank, to be machined so as to form an imaging member for use in an image reproducing machine.

Conventionally, machine tools include apparatus for mounting or securing work-pieces such as drum or tube blank imaging members. One form of such mounting apparatus, for example, comprises a rigid supporting drum on which the imaging layer or layers of the drum or tube blank are mounted. This is not very acceptable because in some applications, for example, in liquid ink imaging processes, xerographic imaging processes and ionographic imaging processes, the finished drum imaging member is required to have very stringent specifications for straightness, taper, and run-out error.

One process for producing such drum imaging members from drum blanks uses a diamond lathe to machine the surface of the drum blank. Although diamond lathe facilities provide good results, it is difficult to mount the drum blanks during machining. The chucking or holding process used for supporting the drum blank during machining tends to non-uniformly stress the drum during the turning cycle. When the holding forces are released, the drum relaxes, tending to adversely affect the straightness of the drum blank.

Various methods and apparatus have been suggested for attempting to resolve or minimize such adverse effects. For example in U.S. Pat. No. 4,822,013 to Johnson, a casing is provided that is filled with location material for securing the workpiece or hollow drum. In commonly assigned U.S. Pat. Nos. 5,138,918, and 6,209,429, a mandrel having a diameter slightly smaller than the inner diameter of the drum blank is located within the drum blank, so that there is a space between the mandrel and the drum blank. This space is filled with a liquid support material which is then solidified to securely hold the drum blank and mandrel together. Further, in commonly assigned U.S. Pat. No. 5,138,918 it is known to use foam dampening plugs that are inserted into the interior of the hollow drum or substrate workpieces, between the chuck devices, prior to the lathing operation. Since the hollow drum workpiece is usually very thin, lathing it without a foam rubber dampening plug or without some form of similar support between the chuck devices causes it to vibrate. Such vibrations ordinarily tend to cause the formation of a "barber pole" pattern which adversely affects electrophotographic images subsequently formed on the finished photoreceptor or imaging member made from the drum blank.

It has been found that despite the use of conventional dampening plugs as above, drum blanks to be machined are becoming relatively longer and thinner, as well as starting to require the maintenance of tighter and tighter tolerances. As such, these relatively longer and thinner drum blanks are no longer sufficiently robust enough to enable an operator to mount them to the machines and to machine them with impunity. As requirements for relatively higher and higher tolerances evolve, it is clear an operator will no longer be able to continue to operate with impunity as such tolerances begin to approach the best capability of the machines being used. None uniformity of the internal stress in the part or workpiece being machined further acerbate these problems making it near impossible to machine the relatively longer drum blanks to be within required tolerances. This is even worse where there are changes in drum blank wall thickness as towards counter-bored ends of the drum blank.

In addition to such problems, inserting dampening plugs properly into the interior of a drum blank is cumbersome and not very precise. It thus ordinarily take a long time, as well as makes it difficult for the operator to close the lathe on the drum blank so as to insure proper alignment of the drum blank with the mounting fixtures or chucks.

Attempted solutions such as tapering the ends of the fixtures that fit into the counter bored ends of the hollow tube or drum blank have instead tended to cause the ends of the drum blanks to flair during machining. Such flaring undesirably results in excess material being removed from the ends of the drum blank during lathing.

Another attempted solution has been to use non-tapered, exact-fitting chucks or machine mounting fixtures for maximizing the contact between end of the drum blank and the fixture in order to transmit the torque required to get the drum blank up to lathing speeds. This requires that more end pressure be used to fit such fixtures into the ends of the drum blank, thus resulting in undesirable higher sumo values. In addition, such non-tapered fixtures ordinarily require a fit between the fixture and the inside diameter of the drum blank that is much less than the normal range for such fits. As a result, the lathe operator often has to keen on changing fixtures over and over until a fixture that precisely matches the lot of drum blanks being lathed or machined is found. Even so, the best fixture as such can change from one box to another of drum blanks.

There is therefore still a need for a drum blank mounting apparatus that is self aligning, that is easy to position, that is independent of drum blank wall thickness, and that will allow an operator to mount and machine a drum blank with relatively no end pressure.

Accordingly, there has been provided a mounting apparatus for mounting a hollow work-piece on a machine includes a circumferential groove formed into an outer surface of a cylindrical supporting fixture of the machine, a dampening plug assembly for positioning inside the hollow workpiece adjacent the cylindrical supporting fixture, and an end pressure reducing device for mounting within the circumferential groove for centrifugally supporting and enabling the reduction of machining-induced pressure from the end of the hollow workpiece.

DESCRIPTION OF THE PREFERRED EMBODIMENT

Figure 1:
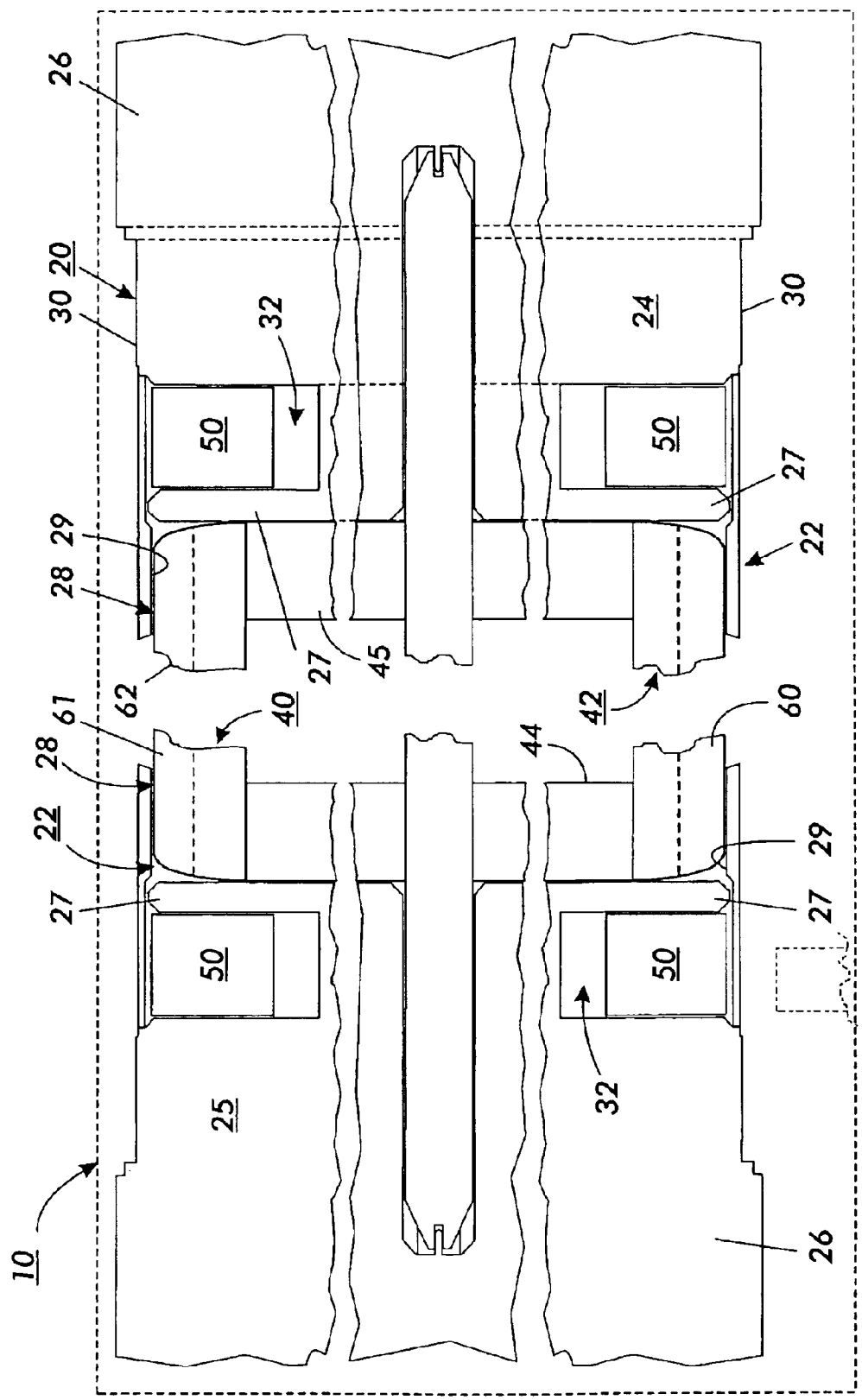
FIG. 1 is a schematic illustration in elevation of part of a machine including the mounting apparatus of the present.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Referring generally to FIGS. 1–7, there is illustrated a portion of a machine for example a lathe 10, including the mounting apparatus 20 of the present invention for mounting a hollow workpiece 22 on the lathe 10. Such a lathe 10 and a process for machining hollow cylinders are disclosed in commonly assigned U.S. Pat. No. 6,209,429, relevant parts of which are incorporated herein by reference. As illustrated, the lathe 10 includes the mounting apparatus 20 of the present invention for mounting a hollow work-piece such as the drum or tube blank 22, to be machined into an imaging member for use in an image reproducing machine.

The mounting apparatus 20 includes a cylindrical supporting fixture 24 attached to the machine 10 and including an end portion 26 for inserting into an end 28 of the hollow workpiece or drum blank 22. As shown, the end portion 26 of the cylindrical supporting fixture 24 has an outer surface 30, and a circumferential groove 32 formed into the outer surface. The mounting apparatus 20 also includes a dampening plug assembly 40, 42 for positioning inside the hollow workpiece 22 adjacent the cylindrical supporting fixture 24, and an end pressure reducing device 50 for mounting within the circumferential groove 32 underneath the wall 29 of the end of the hollow workpiece 22 for centrifugally supporting and enabling the reduction of machining-induced pressure from the cylindrical supporting fixture 24 onto the end of the hollow workpiece.

As further illustrated, the cylindrical supporting fixture 24 includes a fixture end surface 34, a longitudinal axis 36, and an axial slot 37 formed into the fixture end surface 34. A centering pin 38 is mounted within the axial slot 37 for centering the dampening plug assembly 40, and projects from the cylindrical supporting fixture 24 beyond the fixture end surface 34. The centering pin 38 is coupled in a suitable manner to, and for rotation with, the cylindrical supporting fixture 24. As is well known, typically a lathe such machine 10 includes a second one of the cylindrical supporting fixture 24, thereby forming a pair of such cylindrical supporting fixtures for supporting each end of the hollow workpiece.

The dampening plug assembly 40 includes a hollow cylindrical foam member 60 that is inserted within the interior of the hollow workpiece 22 to lie between the cylindrical supporting fixture 24, 25 at each end. The plug assembly 40 also includes a plug support device 44, 45 for mounting within the interior of each end 61, 62 of the hollow cylindrical foam member 60.

The mounting apparatus 20 further includes a series of size-reducing spring devices 64 that are each angled for reducing a size of, and tapering, at least one end 61, 62 of the hollow cylindrical foam member 60 so as to facilitate insertion of the hollow cylindrical foam member into the hollow workpiece 22. In one embodiment, the hollow cylindrical foam member 60 is comprised of an inner foam cylinder 66 and an outer foam cylinder 68, which are together compressible outwardly against an inside wall of the hollow workpiece, when rotated with the hollow workpiece at turning speeds. The inner and outer foam cylinders 66, 68, for example can be made from a foam rubber having a durometer within a range of 5 and 7. For proper fit an operation, the external diameter Dc of the hollow cylindrical foam member 60 as a whole, is slightly less that an inner diameter Dw of the hollow workpiece 22.

In accordance with one aspect of the present invention, the end pressure reducing device 50, although mounted over or into the supporting cyndrical fixture 24, is also compressible outwardly against the inside wall 29 of the end portion 28 of the hollow workpiece 22 when rotated at turning speeds. The end pressure reducing device 50 is also made from a foam rubber, but has a relatively higher durometer within a range of 15 and 25.

In accordance with another aspect of the present invention, the mounting apparatus 20 for mounting the hollow workpiece 22 on the machine 10 includes a first foam rubber member 60 for positioning inside the hollow workpiece 22 between cylindrical supporting fixtures 24, 25. The first foam rubber member 60 as such is cylindrical and has a first density and a first durometer value from within a first range of durometer values. The mounting apparatus 20 also includes a second foam rubber member 50 for mounting within the circumferential groove 32 underneath the wall 29 of the end 28 of the hollow workpiece 22 for centrifugally supporting and enabling the reduction of machining-induced pressure on the end of the hollow workpiece. The second foam rubber member 50 has a donut shape, and a second density different from the first density, and a second durometer value from within a second range of durometer values that is greater than the first range.

The present invention incorporates an improved dampening plug assembly 40 and an improved workpiece-to-lathe mounting and supporting fixture 24. As such, it facilitates optimum dampening plug positioning within the interior of the workpiece as well as enables zero end pressure (eliminating sumo) on the workpiece. The present invention also provides self adjusting or sel-alignment of the moving items (workpiece and mounting apparatus 20) and thereby maximizes the center roundness of the machined workpiece.

Figure 2:
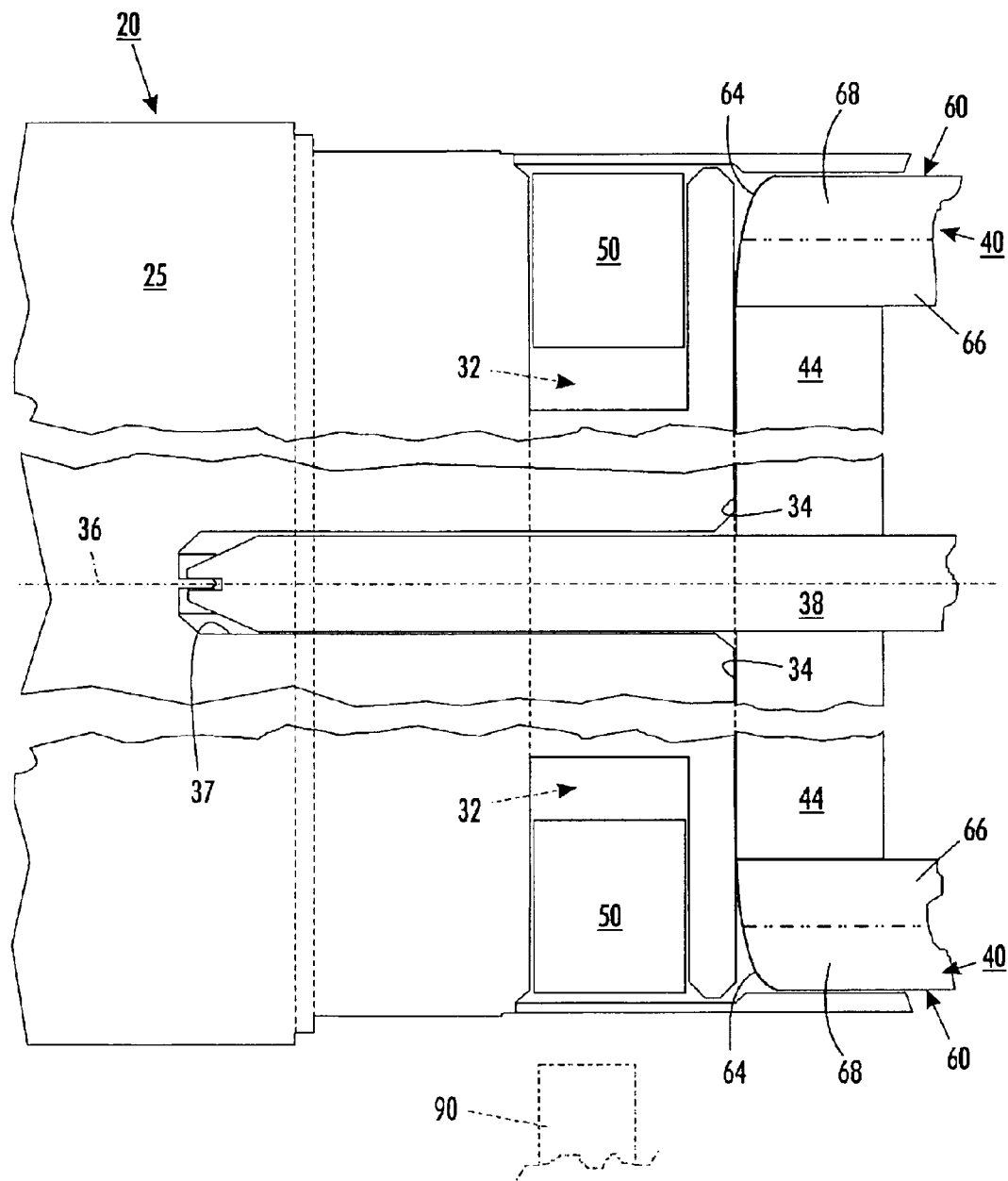
FIG. 2 is a schematic illustration of one side of the mounting apparatus of FIG. 1 in a stationary mode.

Referring specifically to FIGS. 1–2, the distal end of each cylindrical supporting fixture 24, 5 of the machine 10 is tapered or narrowed so as to accept a countered-bored end 28 of the hollow workpiece or drum blank 22. The circumferential groove 32 when cut into the outer surface 30 of each cylindrical supporting fixture 24, 25 leaves a section 27 of the cylindrical supporting fixture 24, 25 at the very end forming the fixture end surface 34. Alternatively, this section 27 of the cylindrical supporting fixture 24, 25 may be detachable from the rest of the cylindrical supporting fixture 24, 25 in order to facilitate loading and unloading of the end pressure reducing device 50. The cylindrical supporting fixture 24, 25 itself may be bolted or otherwise attached to the main body of the machine or lathe 10, and to the main drive (not shown) for transmitting drive torque to the supported workpiece or drum blank 22.

Each of the plug support members 44, 45 may or may not be attached to hollow cylindrical foam member they support. The centering pin 38 or in other words the alignment guide for mounting a workpiece/hollow cylindrical foam member assembly onto the cylindrical supporting fixture 24, simply needs to be inserted into the axial slot 37 with or without engaging any part of cylindrical supporting fixture.

Figure 3:
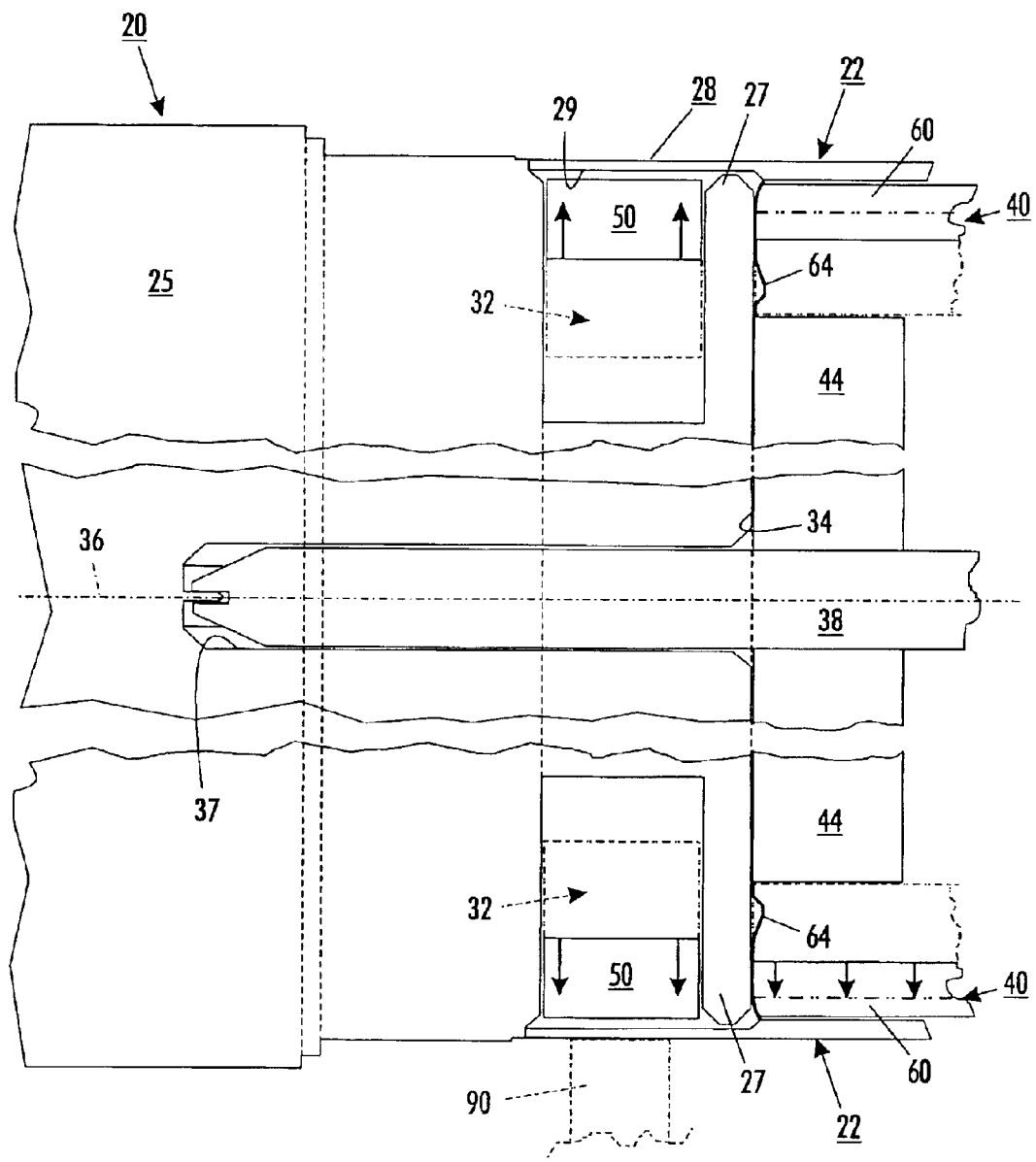
FIG. 3 is the same as FIG. 2 with the mounting apparatus of FIG. 1 and the hollow workpiece being rotated at turning speed.
Figure 4:
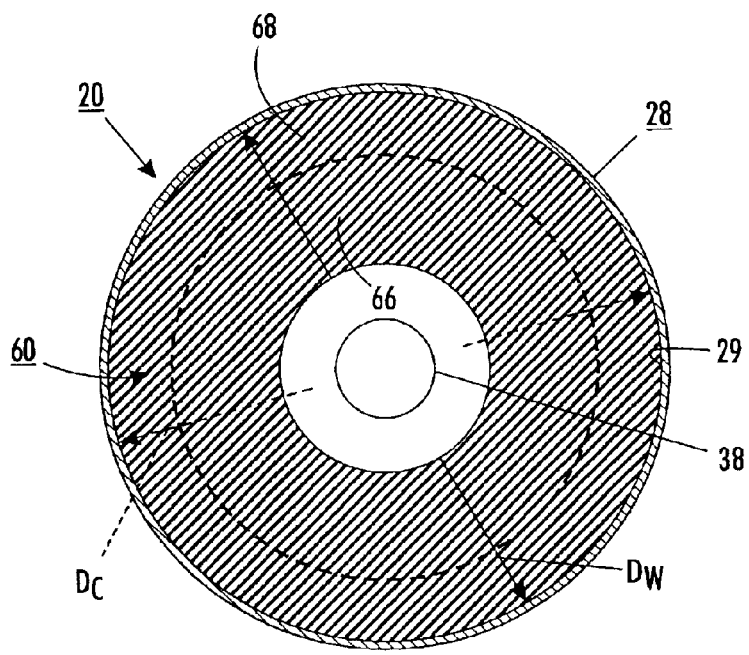
FIG. 4 is a schematic cross-sectional illustration of the cylindrical foam member of the present invention in a stationary mode
Figure 5:
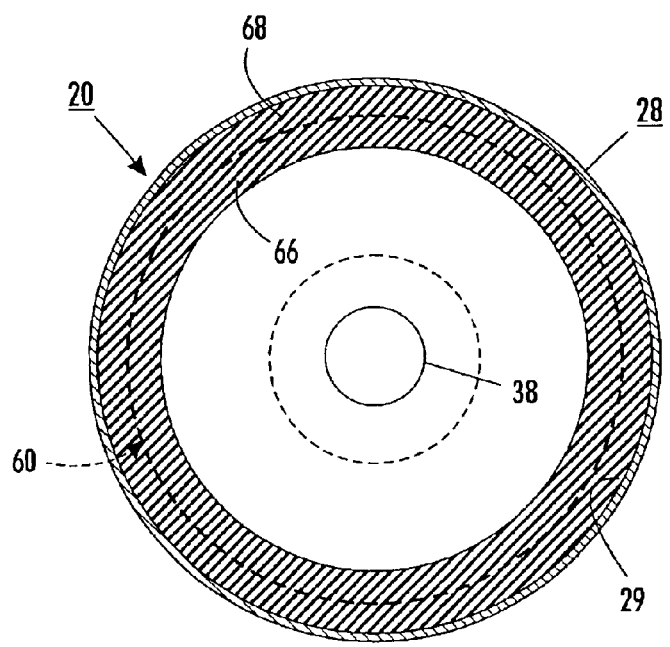
FIG. 5 is a schematic cross-sectional illustration of the cylindrical foam member of the present invention and the hollow workpiece being rotated at turning speed.
Figure 6:
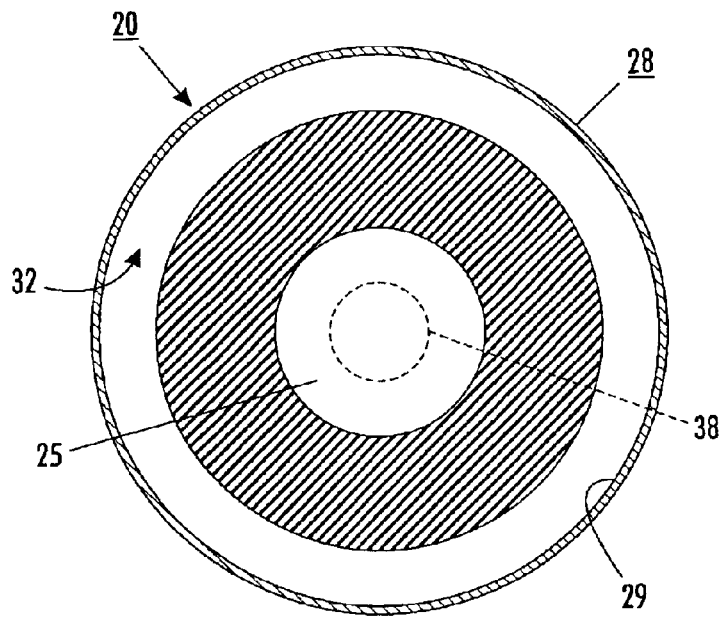
FIG. 6 is a schematic cross-sectional illustration of the end pressure reducing device of the present invention in a stationary mode.

As illustrated in FIGS. 3 and 5, during rotation of the cylindrical supporting fixture at turning or machining speeds, the hollow cylindrical foam member 60 (which is made from a first type of closed cell rubber foam), will become compressed outwardly against the inside of the wall 29 of the hollow workpiece between the fixture ends 24, 25. This is due to the centrifugal force generated by the action of turning the workpiece at such speeds.

Figure 7:
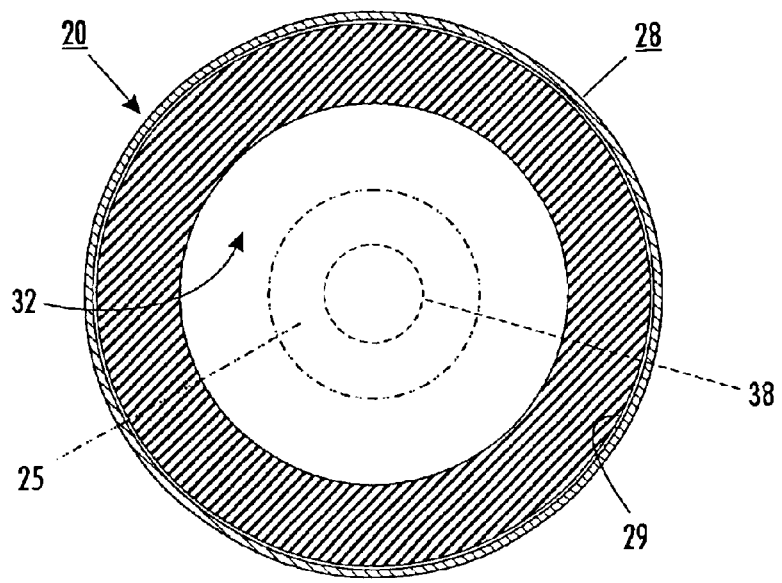
FIG. 7 is a schematic cross-sectional illustration of the end pressure reducing device of the present invention and the hollow workpiece being rotated at turning speed.

As illustrated in FIGS. 3 and 7, the end pressure reducing device 50 is made of a second type of closed cell rubber foam. Its function is to support the counter bored end portion 28 of the hollow workpiece or drum blank 22, as well as to cause a self-alignment of itself and the workpiece 22 as mounted. The density and thickness dimension of this second type of closed cell rubber foam is different from that of the first type of closed cell rubber foam forming the hollow cylindrical foam member 60. During the same rotation of the cylindrical supporting fixture at turning or machining speeds, the end pressure reducing device as such will also become compressed outwardly against the inside of the wall of the end portion of the hollow workpiece. This is due to the centrifugal force generated by the action of turning the workpiece at such speeds.

The series of size-reducing spring devices 64 for example were made by measuring and cutting spring strips into pieces that were then arranged in a rosette around, and affixed to, the hollow cylindrical foam member 60. The function of this series of spring devices 64 is to cause the hollow cylindrical foam member 60 to assume a shape that is easy to insert into the hollow workpiece or drum blank 22. For example, the series of spring devices 64 was composed of 12 springs cut to the same length and arranged around and attached to the hollow cylindrical foam member. The length required will depend on the outside diameter of the hollow cylindrical foam member. The ends of the spring components are shaped into a parabolic form, and made smooth, that is, free of burs, so that the springs will not snag on the foam during operation. Note that the spring devices when attached as described do not interfere with the behavior and function of the hollow cylindrical foam member 60 at turning speed.

In one embodiment, the hollow cylindrical foam member 60 was formed as two separate cylinders 66, 68 that were then assembled one over the other. Each cylinder, an inner cylinder and an outer cylinder was formed from a cut sheet for example of 5 mm thick closed cell foam rubber having a durometer of between 5 and 7. The two cylinders were made so that one, the inner cylinder 66, would fit into the outer cylinder 68, resulting in a final hollow cylindrical foam member 60 that was about 10 mm thick. The sheet for the outer cylinder 68 was cut so that it had an outer diameter (outside length) that was about 0.4 mm less than the inside diameter of the hollow workpiece or drum blank 22.

To make each cylinder from the cut sheet, the edges of the cut sheet to be glued were cut at an angle. For example, the glued edges of the sheet for the outer cylinder were cut angled so that inside length (to be the inside diameter) was ($C_{os}=\pi(d_{os}-10$ mm) shorter than the outside length ($d_{os}$) which of course forms the outer diameter of the resulting hollow cylindrical foam member. The inner cylinder 66 was similarly cut to fit snugly into the outer cylinder. The two foam cylinders 66, 68 were fitted together and rotated so that the glue seams were located 180° apart on the final hollow cylindrical foam member 60.

The end pressure reducing device 50 for example is donut shaped from a face view as opposed to a cross section view thereof. The end pressure reducing device 50 for example was made from a relatively thicker sheet of about 7.5 mm thick closed cell foam rubber having a durometer of from 15 to 25. The durometer and cross sectional thickness of this donut shaped device in general will depend on the wall thickness of the drum blank 22 being supported.

In operation, as the lathe or machine 10 accelerates to operating or turning speed, the end pressure reducing device 50 expands concentrically due to the resulting centrifugal force. When this expansion causes the end pressure reducing device to make contact (this occurs before the lathe reaches full speed) with the inside wall of the end of workpiece or the drum blank 22 being machined, the end pressure on the workpiece 22 and hollow cylindrical foam member 60 will be reduced to zero. This allows the hollow workpiece or drum blank 22 to become completely concentric (that is aligned) with the lathing system (supporting fixture and cutting tool). In cases when the centering pin 38 is engaged by the cylindrical supporting fixture 24, very little (on the order of 0.2 to 0.3 psi.) end pressure is applied by the cylindrical supporting fixture 24 to the ends of the hollow workpiece or drum blank 22 due to the function of the end pressure reducing device 50 as described above.

As can be seen, there has been provided a mounting apparatus for mounting a hollow work-piece on a machine includes a circumferential groove formed into an outer surface of a cylindrical supporting fixture of the machine, a dampening plug assembly for positioning inside the hollow workpiece adjacent the cylindrical supporting fixture, and an end pressure reducing device for mounting within the circumferential groove for centrifugally supporting and enabling the reduction of machining-induced pressure from the end of the hollow workpiece.

What is claimed is:

1. A mounting apparatus for mounting a hollow workpiece on a machine, the mounting apparatus comprising
    (a) a cylindrical supporting fixtures including an end portion for inserting into an end of the hollow workpiece, said end portion having an outer surface, and a circumferential groove formed into said outer surface;
    (b) a dampening plug assembly for positioning inside the hollow workpiece adjacent said cylindrical supporting fixture; and
    (c) an end pressure reducing device for mounting within said circumferential groove underneath the end of the hollow workpiece for centrifugally supporting and enabling the reduction of machining-induced pressure from the end of the hollow workpiece.

2. The mounting apparatus of claim 1, wherein said cylindrical supporting fixture includes a fixture end surface, a longitudinal axis, and an axial slot formed into said fixture end surface.

3. The mounting apparatus of claim 2, including a centering pin mounted within said axial slot for centering said dampening plug assembly.

4. The mounting apparatus of claim 3, wherein said centering pin projects from said cylindrical supporting fixture beyond said fixture end surface.

5. The mounting apparatus of claim 3, wherein said centering pin is mounted within said axial slot for rotation with said cylindrical supporting fixture.

6. The mounting apparatus of claim 1, wherein said dampening plug assembly includes a hollow cylindrical foam member, and a plug support device for mounting within an end of said foam member.

7. The mounting apparatus of claim 6, including a second one of said plug support device, thereby forming a pair of plug support devices for each supporting an end of the hollow workpiece.

8. The mounting apparatus of claim 6, including a series of size-reducing spring devices angled for reducing a size of, and tapering, an end of said hollow cylindrical foam member so as to facilitate insertion of said hollow cylindrical foam member into the hollow workpiece.

9. The mounting apparatus of claim 6, wherein said hollow cylindrical foam member is comprised of an inner foam cylinder and an outer foam cylinder.

10. The mounting apparatus of claim 9, wherein said hollow cylindrical foam member is compressible outwardly against an inside diameter of the hollow workpiece when rotated with the hollow workpiece during machining operations.

11. The mounting apparatus of claim 9, wherein said hollow cylindrical foam member is made from a foam rubber having a durometer within a range of 5 and 7.

12. The mounting apparatus of claim 9, wherein an external diameter of said hollow cylindrical foam member is slightly less that an inner diameter of said workpiece.

13. The mounting apparatus of claim 1, including a second one of said cylindrical supporting fixture, thereby forming a pair of cylindrical supporting fixtures for inserting one into each end of the hollow workpiece.

14. The mounting apparatus of claim 1, wherein said end pressure reducing device is compressible outwardly against an inside diameter of the end of the hollow workpiece when rotated with the hollow workpiece during machining operations.

15. The mounting apparatus of claim 14, wherein said end pressure reducing device is made from a foam rubber having a durometer within a range of 15 and 25.

16. Mounting apparatus for mounting a hollow workpiece on a machine, the mounting apparatus comprising (a) a cylindrical supporting fixture including an end portion for inserting into an end of the hollow workpiece, said end portion having an outer surface, and a circumferential groove formed into said outer surface;

(b) a first foam rubber member for positioning inside the hollow workpiece adjacent said cylindrical supporting fixture, said first foam rubber member having a first density and a first durometer within a first range of durometer values; and (c) a second foam rubber member for mounting within said circumferential groove underneath the end of the hollow workpiece for centrifugally supporting and enabling the reduction of machining-induced pressure from the end of the hollow workpiece, said second foam rubber member having a second density different from said first density, and a second durometer within a second range of durometer values that is greater than said first range.

17. The mounting apparatus of claim 16, wherein said first foam rubber member comprises a cylinder.

18. The mounting apparatus of claim 16, wherein said second foam rubber member comprises has a donut shape.

19. The mounting apparatus of claim 16, including a centering pin mounted within said axial slot for centering said dampening plug assembly.

20. The mounting apparatus of claim 16, including a series of size-reducing spring devices angled for reducing a size of, and tapering, an end of said hollow cylindrical foam member so as to facilitate insertion of said hollow cylindrical foam member into the hollow workpiece.

* * * * *